US012759420B2

(12) United States Patent
Garcia-Ferre et al.

(10) Patent No.: US 12,759,420 B2
(45) Date of Patent: Oct. 13, 2026

(54) EV CHARGING CONNECTOR WITH AIR COOLING, EV CHARGING SYSTEM AND METHOD

(71) Applicant: ABB E-MOBILITY B.V., Delft (NL)

(72) Inventors: Francisco Garcia-Ferre, Baden (CH); Stefan Raaijmakers, Delft (NL)

(73) Assignee: ABB E-Mobility B.V., Delft (NL)

( * ) Notice: Subject to any disclaimer, the term of this patent is extended or adjusted under 35 U.S.C. 154(b) by 948 days.

(21) Appl. No.: 17/947,692

(22) Filed: Sep. 19, 2022

(65) Prior Publication Data

US 2023/0091452 A1 Mar. 23, 2023

(30) Foreign Application Priority Data

Sep. 21, 2021 (EP) .................................... 21198016

(51) Int. Cl.

| | |
|---|---|
| ***B60L 53/302*** | (2019.01) |
| ***B60L 53/16*** | (2019.01) |
| ***B60L 53/18*** | (2019.01) |
| ***B60L 53/66*** | (2019.01) |

(52) U.S. Cl.

CPC ............. *B60L 53/302* (2019.02); *B60L 53/16* (2019.02); *B60L 53/18* (2019.02); *B60L 53/66* (2019.02)

(58) Field of Classification Search

CPC ........ B60L 53/302; B60L 53/66; B60L 53/16; B60L 53/18

USPC .......................................................... 320/109

See application file for complete search history.

(56) References Cited

U.S. PATENT DOCUMENTS

| | | | | |
|---|---|---|---|---|
| 5,984,706 A * | 11/1999 | Kakuta | .................. | H01R 13/52 439/310 |
| 2020/0395147 A1 | 12/2020 | Shabgard et al. | | |
| 2021/0050127 A1* | 2/2021 | Lee | ....................... | B60L 53/302 |

FOREIGN PATENT DOCUMENTS

| | | | | | |
|---|---|---|---|---|---|
| CN | 1676973 A | | 10/2005 | | |
| CN | 105835709 A | | 8/2016 | | |
| CN | 107444174 A | | 12/2017 | | |
| CN | 215436042 U | * | 1/2022 | | |
| CN | 114243402 A | * | 3/2022 | ........... | H05K 7/2039 |
| CN | 116544708 A | * | 8/2023 | ........... | H01R 13/502 |
| CN | 117360286 A | * | 1/2024 | ............. | H01R 13/40 |
| CN | 118953091 A | * | 11/2024 | .............. | B60L 53/16 |
| DE | 102015101140 A1 | | 7/2016 | | |
| EP | 3043421 A1 | * | 7/2016 | ........... | B60L 53/302 |
| EP | 3770005 A1 | | 1/2021 | | |
| EP | 3770007 A1 | | 1/2021 | | |
| EP | 4000992 A1 | * | 5/2022 | .............. | B60L 53/31 |
| EP | 4134266 A1 | * | 2/2023 | ........... | B60L 53/302 |

(Continued)

OTHER PUBLICATIONS

European Patent Office, Extended European Search Report in European Patent Application No. 21198016.4, 9 pp. (Feb. 16, 2022).

*Primary Examiner* — Suresh Memula

(74) *Attorney, Agent, or Firm* — McCarter & English, LLP; Michael M. Gnibus

(57) ABSTRACT

An electric vehicle (EV) charging connector comprises a charging cable. The charging cable comprises charging lines configured to carry charging current and at least one air tube. The contact element is connected to the charging cable and is the galvanic contact interface to a car inlet; and each air tube is configured to lead an air stream directly to the hot portion of the EV charging connector such that air of the air stream flows around the hot portion.

11 Claims, 2 Drawing Sheets

(56) References Cited

FOREIGN PATENT DOCUMENTS

| | | | | |
|---|---|---|---|---|
| EP | 4151450 | A1 * | 3/2023 | .............. B60L 53/66 |
| WO | WO 2019/192249 | A1 | 10/2019 | |
| WO | WO 2020/150105 | A1 | 7/2020 | |
| WO | WO 2021/107503 | A2 | 6/2021 | |

* cited by examiner

EV CHARGING CONNECTOR WITH AIR COOLING, EV CHARGING SYSTEM AND METHOD

CROSS-REFERENCE TO RELATED APPLICATIONS

This patent application claims priority to European Patent Application No. 21198016.4, filed on Sep. 21, 2021, which is incorporated herein in its entirety by reference.

FIELD OF THE DISCLOSURE

The invention relates to an EV (Electric Vehicle) charging connector, an EV charging station, an EV charging system, a method for cooling parts of an EV charging connector, and a use of an air tube for cooling parts of an EV charging connector.

BACKGROUND OF THE INVENTION

Current EV charging connectors suffer from deficiencies such as ingress of water into the connectors, mechanical damage of plastic parts and over-heating. Passive cooling devices may not be sufficient to provide a cooling required to prevent such damages caused by overheating. On the other side, active cooling devices are exhaustive to implement.

BRIEF SUMMARY OF THE INVENTION

The present disclosure describes systems and methods relating to a charging connector for an electric vehicle having an improved cooling arrangement.

The described embodiments pertain the EV charging connector, the EV charging station, the EV charging system, the method for cooling parts of an EV charging connector, and the use of an air tube for cooling parts of an EV charging connector. Synergetic effects may arise from different combinations of the embodiments although they might not be described in detail.

Further on, it shall be noted that all embodiments of the present invention concerning a method, might be carried out with the order of the steps as described, nevertheless this has not to be the only and essential order of the steps of the method. The herein presented methods can be carried out with another order of the disclosed steps without departing from the respective method embodiment, unless explicitly mentioned to the contrary hereinafter.

Technical terms are used by their common sense. If a specific meaning is conveyed to certain terms, definitions of terms will be given in the following in the context of which the terms are used.

BRIEF DESCRIPTION OF THE SEVERAL VIEWS OF THE DRAWING(S)

DETAILED DESCRIPTION OF THE INVENTION

Corresponding parts are provided with the same reference symbols in all figures.

Figure 1:
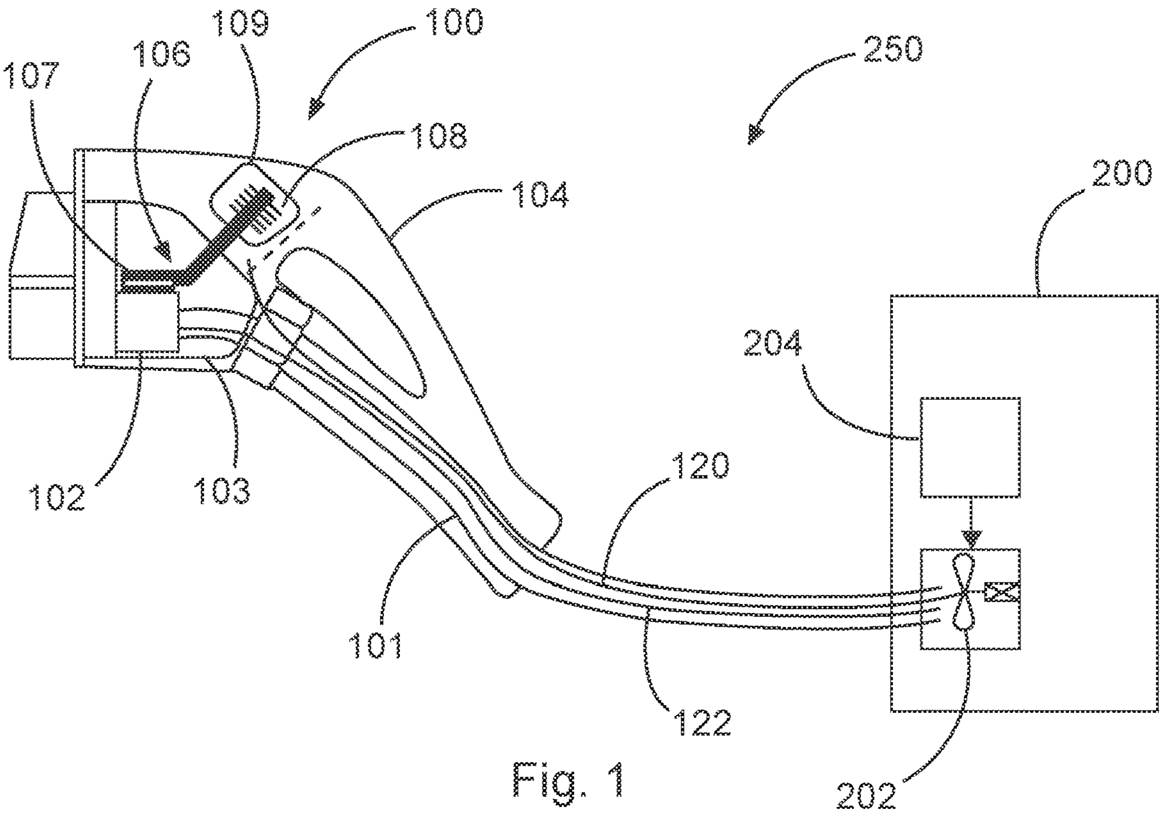
FIG. 1 is a diagram of an EV charging system with an EV charging connector and an EV station in accordance with the disclosure.

FIG. 1 shows a diagram of an EV charging system 250 with a passively cooled EV charging connector 100 and an EV station 200. The EV charging connector 100 comprises a heat pipe 106 as passive cooling device with fins 108, a condenser portion 109 and an evaporator 107. The heat pipe 106 is mechanically and thermally connected to the contact element, which comprises the contacts representing the galvanic interface to the contacts of a charging plug socket that may be realized as car inlet. The EV charging connector 100 is connected to the EV charging station 200, also referred to as charging post 200, by a charging cable 101 comprising power lines 122 carrying the charging current. An air stream or air flow is provided through an air tube 120 to cool the fins 108 of the heat pipe 106. The air stream is actively generated by an air stream generator 202, such as a fan or compressor, that is located inside the charging station 200. Therefore, a hybrid combination of passive and active cooling is obtained. Hereby, the air stream to the fins of the condenser of the heat pipe 106 may be relatively small. The connector has an external housing 104 enclosing an inner housing 103. The external housing encloses a first compartment, in which the condenser and the condenser fins are arranged, and encloses the inner housing 103. The inner housing 103 is tight to protect the enclosed contact element 102 from water and dirt, which may intrude through the external housing 104 into the first compartment. That is, the first compartment exchanges air with the environment. Therefore, when cooling the condenser portion 109 or the fins 108 of the heat pipe, the air is heated and exchanged with the environment. On the other side, the second, inner compartment remains airtight and watertight.

The charging station 200 may further comprise a controller that controls the air flow and/or the charging current in dependence on temperature data received from the connector 100. It may further comprise a cooling device (not shown) that cools the air before it is inserted into the air tube 120.

Figure 2:
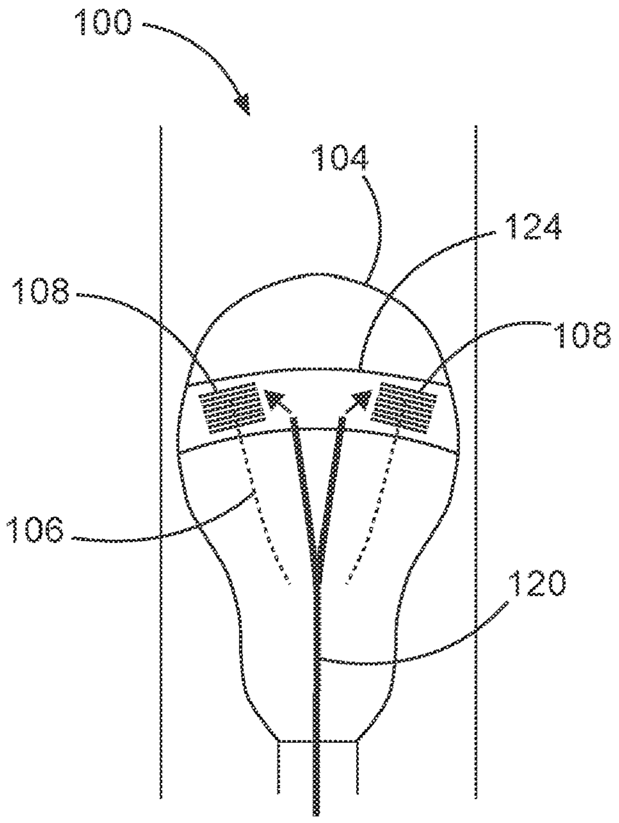
FIG. 2 is a top view diagram of an EV charging connector in accordance with the disclosure.

FIG. 2 shows a top view diagram of an EV charging connector 100 with an arrangement according to some embodiments. The connector 100 comprises two heat pipes 106, each having condenser fins 108. The first heat pipe may be connected to the DC+ contact element 102, and the second one to the DC− contact element 102. The air tube 120 is split Y-shaped inside the connector 100 such that the air stream is divided and reaches both sides of the connector 100 and supplies the air stream to the condensers with fins 108. Alternatively, the two condensers with fins 108 could be a single block. Such an arrangement could benefit from two or even more separated air streams, ideally one air stream per each single fin of the fins 108 present in the condenser. Further, a structure 124 might be added to manipulate the flow of the air. For example, a stator might be added between the air tube 120 providing the air stream and the condenser fins 108, in order to increase the turbulence of the air flow, or the structure such as structure 124 in FIG. 2 might direct the air flow. The air tube may further comprise a plurality of legs and/or openings along the tube, to take the flow to individual fins within the condenser.

Figure 4:
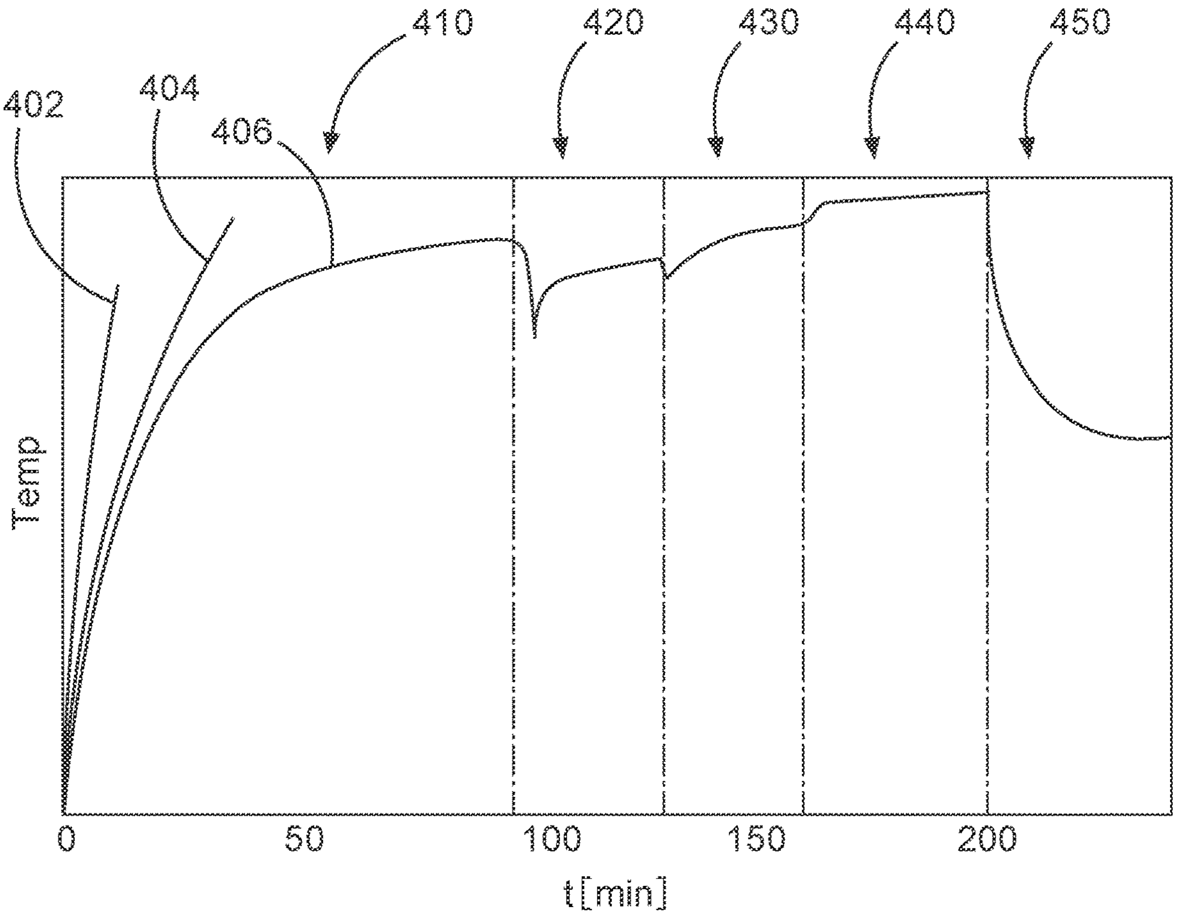
FIG. 4 is a flowchart for a method of cooling the EV charging connector in accordance with the disclosure.

FIG. 4 shows a graph with the temperature of the contact elements 102 as a function of time, measured for a benchmark supplier (Rema, curve 404) with a car socket having conductors of either 70 mm or 120 $mm^2$, and a connector 100 as described herein. The connector 100 includes an inner housing 103 or "enclosure" bridged by heat pipe 106 and condenser. The connector 100 was only measured with the 70 $mm^2$ car socket (more conservative scenario), under changing conditions. At first, the connector was tested without heat pipes (curve 402 in FIG. 4). Then the heat pipes were added (curve 406). In the beginning in phase 410, no external enclosure 104 was used. Then, after a down time in phase 420, the enclosure 104 was added in phase 430, with holes allowing for natural convection. In phase 440, such holes were closed, leading to a degradation of thermal performance. Lastly, in the final phase 450, an air stream generator 202 was added resulting in the best possible thermal performance, demonstrating that the use of an air stream generator such as a fan or compressor can bring huge benefits. It is worth noting that the starting point with connector 100 without heat pipe is worse than the benchmark supplier (i.e. higher temperatures at the contacts), which can be explained by the fact that the contacts 102 are very well thermally and mechanically insulated. That is, the connector 100 is a very safe connector. By implementing the cooling system described herein, the thermal performance becomes better than Rema (with the same 70 $mm^2$ car inlet). Moreover, if also the air stream generator 202 is implemented, then the thermal performance is even better than Rema with the larger car inlet. Note the dramatic decrease of temperatures once the air stream generator 202 is turned on and a supply of air flow reaches the fins 108 of the condenser.

Figure 3:
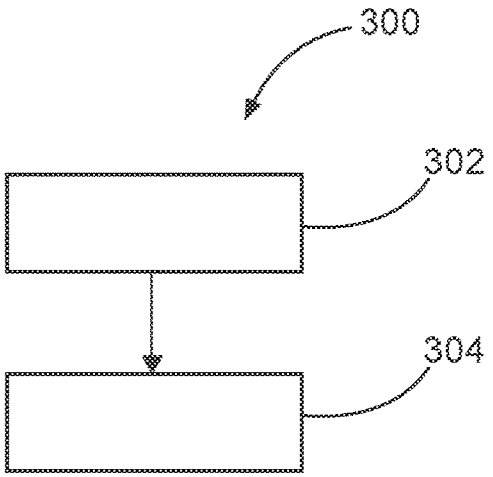
FIG. 3 is a diagram of temperature curves in accordance with the disclosure.

Referring to FIGS. 3 and 1, FIG. 3 shows a flow diagram of a method 300 for cooling the EV charging connector. The method 300 comprises the following steps: In a first step 302, an EV charging connector 100 is provided. The EV charging connector 100 comprises a charging cable 101, a contact element 102, and at least one air tube 120. The charging cable 101 comprises charging lines 122 configured to carry charging current. The contact element 102 is connected to the charging cable 101 and is the galvanic contact interface to a car inlet. The contact element 102 is a part of a hot portion of the connector 100. In a second step 304, an air stream is lead to at least a part of the hot portions of the connector. The method may comprise further steps that corresponds to the configuration of EV charging connector and/or the EV charging station and hence are not repeated here.

Other variations to the disclosed embodiments can be understood and effected by those skilled in the art in practicing the claimed invention, from the study of the drawings, the disclosure, and the appended claims. In the claims the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. Any reference signs in the claims should not be construed as limiting the scope of the claims.

According to a first aspect of the present disclosure, an EV charging connector is provided. The EV charging connector comprises a charging cable and a contact element. The charging cable comprises charging lines configured to carry charging current, and at least one air tube. The contact element is connected to the charging cable and is the galvanic contact interface to a car inlet. The at least one air tube is configured to lead an air stream directly to the hot portion of the EV charging connector such that air of the air stream flows around the hot portion.

Under "hot portion" parts inside the connector are understood that may get warm or hot during a charging session. That is, they do not necessarily be hot at all times. This means, for example, that the air stream may be provided to these parts before they get hot. During a charging session, the contacts, or the contact elements, respectively, represent a heat source.

The charging cable coming from a charging station is received by the connector and ends at the contact element. The contact element may comprise a compartment for one or more contacts that connect the cable carrying the charge current from the charging station with the corresponding contact of the car inlet. The contact element may be galvanically connected to the contacts or insulated. In the following, it is not distinguished between the contact element and the contacts.

The air stream provides cooling air directly to the hot parts, which are especially, for example, the contact element, parts of the cable near the contact element, parts of the housing, etc. Further, it may support the exchange of hot air with cool air in the free spaces in the housing and thus support the convection. Since the air tube is included in the charging cable and therefore lead along and directly next to the charging wires, the air stream can be lead precisely to the parts heated by the charging current. As an effect, the cooling is effective requiring only a low air pressure and, no special design for additional inlets for, e.g., a separate cable or cooling lines.

The number of air tubes in the charging cable coming from the charging station is in principle not limited, however, preferably, the number is one, two or three. It may a compromise between form factor, flow rate, efficiency, etc., and may take the inner structure of the connector into account, as well as, for example, the number and arrangement of passive cooling elements to be cooled by the air stream(s).

With respect to pure passive cooling, a better performance and effectiveness is achieved. With respect to active cooling with liquid, the weight of the cable and thus also the connector is reduced. Further, fans are less expensive, easier to install and easier to maintain. Further, no closed circuit is necessary. The air is led directly to the hot parts through an opening of the air tube such that the hot parts are hit and flowed around by the air. An insulation and cumbersome designed liquid tight circuits and parts are not required. Finally, by the invention no active cooling device in the connector required.

According to an embodiment, the EV charging connector further comprises a passive cooling device connected to the contact element, wherein the passive cooling device is a further part of the hot portion of the connector.

The contact element may be made of metal. It represents the heat source of the connector. The passive cooling device is attached to this contact element for receiving the heat and transferring the heat to portions of the connector, where the heat can be dissipated to the environment. The passive cooling element may be, for example, a solid or hollow metallic or ceramic heat conductor. Since the contact element, which conducts the heat from where it is generated to the cooling element, the cooling element is also a part of the hot portion of the connector. The EV charging connector may comprise more than one passive cooling devices.

According to an embodiment, a first one of the at least one air tubes leads to a contact element for a positive voltage and a second one of the at least one air tubes to a contact element for a negative voltage.

In other words, there may be two, or possibly more than two, independent air tubes, each providing an air stream for a heat source such as contact elements at the end of a power line such as a positive or a negative DC line of the cable. Further independent air tubes may be used to lead air streams to different portions of the connector.

According to an embodiment, the at least one air tube comprises a plurality openings as air outlets.

Except for, or instead of, having a single opening at the end the air tube, the air tube may have openings or holes along the tube, in regions where the escaping air has an effect on the cooling of the hot portion of the connector.

According to an embodiment, at least one air tube splits into at least two branches and each of the split branches is configured to provide an air stream to a different part of the connector.

This embodiment allows for reducing the number of air tubes through the cable and nevertheless providing air steams to different parts of the connector. The diameter of the split air tube portions, i.e. branches, may differ from each other, such that the amount of airflow and thus the cooling at different parts may be adjusted.

According to an embodiment, the EV charging connector further comprises an air guiding structure, wherein the air guiding structure is configured to guide the airflow of the air stream from the air tube in a free space of the connector.

The air guiding structure deflects the air stream escaping from the air tubes and leads the air inside the connector through the free space within the enclosure of the connector to the desired portions. The structure may be designed such that the escaping air stream is split into two or more parts such that different regions inside the connector can be cooled. The air can further be guided such that it passes hot portions of the connector and leaves the connector at openings of the enclosure, such that the air heated by the hot portions is dissipated immediately to the environment.

According to an embodiment, the passive cooling element is a heat pipe. A heat pipe is a very effective heat conductor. The pipe is filled partly with a coolant, for example a liquid or water, which is evaporated in the portion near the heat source, i.e., the contact or contact element. The evaporated coolant transfers the heat towards the heat dissipation portion of the heat pipe, where the coolant is condensed. The coolant then flows back to the evaporator portion through gravity forces or through a capillary structure inside the pipe, such as a wick or a porous structure.

Therefore, at least one of the air tubes is configured to cool a part of the heat pipe. The cooled part may be yet a part near the contact element such as the evaporator; however, preferably the cooled part is the condenser portion, such that the heat pipe can work effectively.

According to an embodiment, the EV charging connector further comprises fins attached to the heat pipe, and at least one air tube is configured to cool one of the fins.

An effective heat dissipation can be achieved by attaching fins to the pipe. A single fin may be cooled by the air escaping from one air tube or more than one fin may be cooled.

The connector may have two housings, which are an external and an inner housing. The external housing forms the handle for the user. It encloses a first compartment, which forms a hollow with a free space filled with air. In the first compartment, a portion of the passive cooling device is located. This portion is the heat-dissipating portion that dissipates the heat to the air. The external housing may not be tight such that the heated air can leak to the environment and fresh air can enter the first compartment such that a cooling is achieved. The external housing further encloses the inner housing. The inner housing may be tight such that no air and no water can enter. The inner housing encloses a second compartment with a free space. In the second compartment, the contact element is arranged that connects the cable carrying the charge current from the charging station with the corresponding contact element of the car inlet. The passive cooling device runs from the contact element through the free space of the inner compartment and passes the inner housing through a sealed opening in the inner housing, and finally ends in the first compartment. In this way, the heat is conducted from the contact element to the first compartment where it is dissipated and can escape to the environment. In such an arrangement, the air tubes may provide the air stream to the parts, for example, condenser portion of the heat pipe, fins, etc. in the second compartment, where an air exchange with the environment is possible.

According to an embodiment, the EV charging connector further comprises temperature sensors configured to provide temperature data of the hot portions, wherein the flow rate of the air stream is controlled in dependence on the temperature data.

In this way, resources may be saved. Especially, the load for the air stream generator generating the air stream can be reduced. Further, if the air stream has a high velocity, noise may be generated at the outlets of the air tube, that may be avoided be reducing the pressure, or the velocity of the air stream.

According to a further aspect, an EV charging station is provided. The EV charging station comprises an air stream generator, a charging cable that comprises a line configured to carry charging current to a charging connector, and an air tube. The air stream generator is configured to generate an air stream in the air tube and to lead an air stream directly to the hot portion of an EV charging connector such that air of the air stream flows around the hot portion.

A fan or a compressor may generate the air stream, such that the air stream generator of the EV charging station may comprise such devices.

According to an embodiment, the EV charging station further comprises a control unit, wherein the control unit is configured to receive temperature data from the charging connector and to control the air stream dependent on the temperature.

The temperature data may further be used for controlling the charging current. For example, the cooling by the air streams may not be sufficient as a single measure. In this case, additionally the charging current may be reduced.

According to an embodiment, the EV charging station further comprises a cooling device configured to cool air for the air stream.

That is, the air for the air stream may be taken directly from the environment or may be cooled by the cooing device prior to the insertion into the air tube.

According to a further aspect, an EV charging system comprising an EV charging connector as described herein and an EV charging station as described herein is provided.

According to a further aspect, a use of an air tube for cooling parts of an EV charging connector as described herein is provided.

According to a further aspect, a method for cooling parts of an EV charging connector is provided. The method comprises the following steps: In a first step an EV charging connector is provided. The EV charging connector comprises a charging cable, a contact element, and at least one air tube. The charging cable comprises charging lines configured to carry charging current. The contact element is connected to the charging cable and is the galvanic contact interface to a car inlet; and each air tube is configured to lead an air stream to at least a part of the hot portions of the connector. In a second step, an air stream is lead to at least a part of the hot portions of the connector.

The method may comprise further steps that correspond to the configuration of EV charging connector and/or the EV charging station and hence are not repeated here.

These and other features, aspects and advantages of the present invention will become better understood with reference to the accompanying figures and the following description.

REFERENCE NUMERALS

100 EV charging connector
101 charging cable
102 contact element
103 inner housing/enclosure
104 external housing/enclosure
106 passive cooling device/heat pipe
107 evaporator portion
108 fins
109 condenser portion
120 air tube
122 charging lines
124 structure
200 charging station
202 air stream generator
250 EV charging system
300 method for cooling parts of an EV charging connector
302 method step
304 method step
402 temperature curve without heat pipes
404 temperature curve Rema
406 temperature curve heat pipes added
410 temperature curve start phase, no external enclosure
420 temperature curve down time phase
430 temperature curve enclosure added
440 temperature curve holes closed
450 temperature curve air stream generator added All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An electric Vehicle (EV) charging connector, comprising:
- a charging cable that includes charging lines, which are configured to carry charging current, and at least one air tube;
- a contact element connected to the charging cable, the contact element being a galvanic contact interface to a car inlet; wherein the contact element is a part of a hot portion of the EV charging connector;
- a passive cooling device connected to the contact element, wherein the passive cooling device is a further part of the hot portion of the EV charging connector; and
- wherein the least one air tube is configured to lead an air stream directly to the hot portion of the EV charging connector for cooling the hot portion such that air of the air stream flows at least partially around the hot portion.

2. The EV charging connector according to claim 1, wherein a first one of the at least one air tubes leads to a contact element for a positive voltage and a second one of the at least one air tubes leads to a contact element for a negative voltage.

3. The EV charging connector according to claim 1, wherein the at least one air tube comprises a plurality of openings as air outlets.

4. The EV charging connector according to claim 1, wherein the at least one air tube splits into at least two branches and each of the split branches is configured to provide an air stream to a different part of the connector.

5. The EV charging connector according to claim 1, wherein the EV charging connector further comprises an air guiding structure, and wherein the air guiding structure is configured to guide the air flow of the air stream from the air tube into a free space of the EV charging connector.

6. The EV charging connector according to claim 1, wherein the passive cooling device is a heat pipe.

7. The EV charging connector according to claim 6, wherein the EV charging connector further comprises fins attached to the heat pipe, and wherein at least one air tube is configured to cool one of the fins.

8. The EV charging connector according to claim 1, wherein the EV charging connector further comprises temperature sensors configured to provide temperature data of the hot portions, and wherein the flow rate of the air stream is controlled in dependence on the temperature data.

9. An electric vehicle (EV) charging station, comprising:

an air stream generator; and a charging cable, the charging cable comprising:

a line configured to carry charging current to an EV charging connector; and an air tube;

wherein the air stream generator is configured to generate an air stream in the air tube and to lead the air stream directly to a hot portion of an EV charging connector for cooling the hot portion such that air of the air stream flows around the hot portion and a control unit that receives temperature data from the EV charging connector and controls the air stream dependent on the temperature.

10. The EV charging station according to claim 9, further comprising a cooling device configured to cool at least a portion of the air stream.

11. A method for cooling parts of an electric vehicle (EV) charging connector, comprising:

providing an EV charging connector comprising a charging cable, wherein the charging cable comprises charging lines configured to carry charging current, and a contact element connected to the charging cable, the contact element being the galvanic contact interface to a car inlet; wherein the contact element is a part of a hot portion of the EV charging connector; and at least one air tube, each configured to lead an air stream to the hot portion of the connector, wherein the EV charging connector further comprises a passive cooling device connected to the contact element, and the passive cooling device is a part of the hot portion of the EV charging connector, and leading an air stream directly to the hot portion of the EV charging connector for cooling the hot portion such that air of the air stream flows around the hot portion.

* * * * *